(12) United States Patent
Glerum et al.

(10) Patent No.: US 7,644,393 B2
(45) Date of Patent: *Jan. 5, 2010

(54) SYSTEM AND METHOD FOR STORING AND REPORTING INFORMATION ASSOCIATED WITH ASSERTS

(75) Inventors: Kirk A. Glerum, Redmond, WA (US); Matthew J. Ruhlen, Redmond, WA (US); William Kennedy, Issaquah, WA (US); Jeff David Mitchell, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 917 days.

This patent is subject to a terminal disclaimer.

(21) Appl. No.: 11/190,348

(22) Filed: Jul. 26, 2005

(65) Prior Publication Data
US 2005/0262484 A1 Nov. 24, 2005

Related U.S. Application Data

(63) Continuation of application No. 09/602,252, filed on Jun. 23, 2000, now Pat. No. 6,944,849.

(51) Int. Cl.
*G06F 9/44* (2006.01)
*G06F 11/00* (2006.01)

(52) U.S. Cl. .......... 717/127; 717/131; 714/38; 714/49; 719/318

(58) Field of Classification Search ........... 717/127, 717/128, 130; 714/35, 49; 712/227
See application file for complete search history.

(56) References Cited

U.S. PATENT DOCUMENTS 5,291,583 A * 3/1994 Bapat .................. 717/137

* cited by examiner

*Primary Examiner*—Eric B Kiss
(74) *Attorney, Agent, or Firm*—Merchant & Gould; Ryan T. Grace (57) ABSTRACT

In a software development environment, a system and method for associating an assert with a unique identifier ("assert tag"), and using the unique identifier to store information associated with the assert in a database. Based on the unique identifier, information associated with the assert can be stored in a database or repository that contains assert information. This information can be updated, as well as displayed to the developer or tester. Information for the bugs associated with the assert can be retrieved from a database containing bug information and displayed to the developer or tester. Once the developer or tester has been presented with the information concerning the bugs associated with the assert, or other information associated with-the assert, the developer or tester can choose to enter or log-in a new bug into the database containing bug information.

20 Claims, 7 Drawing Sheets

| | assert tag | HitsReleased | MaxVertical | HitsMaxVerRel | HitsUnreleased | BugID |
|---|---|---|---|---|---|---|
| 4965 | gggo | 827 | 10.0.1206.1 | 21 | 142 | 30677, 47654, 51545, 56541, 86340 |
| 2853 | eupo | 791 | 10.0.1206.1 | 33 | 407 | 45514, 50386, 50650, 57496, 63528 |
| 2723 | fxnr | 649 | 10.0.1206.1 | 15 | 481 | 43153, 49604, 55772 |
| 2713 | arbm | 501 | 10.0.1206.1 | 6 | 439 | 53632, 55166, 63249, 65116, 67353, 69669, 69838 |
| 2710 | dcew | 453 | 10.0.1206.1 | 10 | 183 | 50992 |
| 3386 | fynz | 371 | 10.0.1206.1 | 2 | 663 | 61055, 65678 |
| 3054 | enqb | 336 | 10.0.1206.1 | 5 | 354 | 65019, 66123, 66378, 66385, 66717 |
| 2650 | exsw | 325 | 10.0.1206.1 | 1 | 1461 | 54857, 57034, 53783 |
| 2711 | aagz | 317 | 10.0.1206.1 | 6 | 664 | 22221, 42754, 55283, 65637, 67506, 67671 |
| 3332 | erac | 281 | 10.0.1206.1 | 8 | 54 | 43234, 89405, 69638 |
| 2721 | fcog | 257 | 10.0.1206.1 | 1 | 473 | 53533, 52590 |
| 2774 | dcfs | 228 | 10.0.1206.1 | 3 | 84 | |
| 2774 | esib | 224 | 10.0.1206.1 | 12 | 64 | 37223, 55054 |

*FIG. 6A*

| BUG ID | ASSIGNED TO | TITLE | STATUS | FIXED REV |
|---|---|---|---|---|
| 26349 | Weidezh | WHEN TRY TO INSERT TABLE WITH A TABLE FORMAT, GET A.F. AND CRASH | ACTIVE | |
| 53276 | CLOSED | ASSERT IN DRSP.CPP 8741 WHEN DRAW AN OBJECT IN A WIZARD | CLOSED | 10.00.00.1101 |
| 54429 | CLOSED | HTML IMPORT: GPF OPENING HTML WITH ESCHER OBJECTS ON THE MASTER PAGE | CLOSED | 10.00.00.1202 |
| 55507 | CLOSED | AF/CRASH: DRSP.CPP 8741 -INSERT TEF ON A BACKGROUND PAGE IN HEADER/FOOTING MODE | CLOSED | 10.00.00.1105 |
| 57875 | CLOSED | AF IN CANVAS DRAWING A LINE | CLOSED | 10.00.00.1108 |

*FIG. 6B*

SYSTEM AND METHOD FOR STORING AND REPORTING INFORMATION ASSOCIATED WITH ASSERTS

RELATED APPLICATIONS

This application is a continuation of application Ser. No. 09/602,252, filed Jun. 23, 2000, which application is incorporated herein by reference.

TECHNICAL FIELD

This invention relates to software program modules used in a software development environment. More particularly, this invention relates to a method and system for tracking, storing, and retrieving information associated with an assert and software bugs related to the assert.

BACKGROUND OF THE INVENTION

Despite the best efforts of software developers, software programs inevitably fail at one time or another. One type of failure is a crash. Crashes are frustrating to users and, in some cases, may cause the user to lose work. Another type of software program failure is a set-up failure. Set-up failures occur during installation of a program module onto a user's computer. Set-up failures may prevent certain aspects of the program module, or even the entire program module, from being installed on a user's computer.

A crash occurs while a program module is running and results in the suspension of operation of the program module. A crash may also occur if a software program or application operates to result in a state or value that causes the program to fail. For example, an unacceptable state or condition may be that X=10. Thus, any execution or operation of the software program that results in "X" being equal to "10" will cause the application to fail or crash. Each illegal execution or operation that the program performs may be said to be a "bug" that causes X=10, which results in the crash. Thus, any particular software application can have numerous operations that may cause a particular unstable state, such as X=10.

The use of asserts is a standard programming practice well known in the art. Typically, an assert is code in the software program that will alert a developer (or tester) as to whether the assumptions the software developer has made about the state of the program are not correct. For example, if a software developer believes that an operation will result in an expected condition, such as Y!=10 (Y is not equal to 10), the developer would write code into the source code file of the program to notify the developer (or a tester), of the absence of the expected state or condition. This code, known as an "assert" typically causes the display of a dialog box ("assert dialog box") that informs the developer that the expected condition has not occurred. Thus, with the assert in place, the assert code will operate to display the assert dialog box informing the developer that the expected condition has not occurred (e.g., Y=10). Anytime an operation causes an assert to execute, the assert can be said to have been "hit" and the assert will "fire" a notification alert, such as a dialog.

As applied to diagnosing software instability such as crashes, asserts are useful in that they may be used to alert software developers and software testers of instabilities in a program. For example, if an event causes an illegal value to occur (such as X=10), an assert would "fire," that is, it would display an assert dialog box informing the developer that the operation that was just performed resulted in and illegal or faulty condition such as X=10.

Although the firing of an assert might indicate no more than a faulty assertion that is not related to any real defect in the product, the firing of an assert may also indicate a real problem that should be fixed. In this application, a "bug" is defined as the firing of an assert that results from an operation performed by the software that results in a faulty condition. As applied in this application then, a bug occurs whenever an assert has fired.

In the current technology, the information displayed in an assert dialog box only indicates the name of the source code file and the line number on which the assert code was placed. A software tester who encounters the assert may enter this information about the bug into a table or database (resulting in the creation and maintenance of a "bug" database). Typically, the information entered usually comprises the failing condition, the name of the source code file and the line number on which the assert code was placed. Each bug may have a unique number associated with the bug.

The assert entries in the bug database can then be investigated by software developers, who can then make corrections to the product as appropriate. The bug can then be indicated as being resolved in the database (where the bug is, by definition in this application, the firing of the assert due to a faulty condition resulting).

However, a problem arises when software developers subsequently add lines of code to the source code of the computer software application being developed. Lines are added when, for example, new software versions are being developed. Each modification of the source code of the software application results in a different version, or "build" of the software application. When additional lines of code are placed into the source code, and an assert is hit, the assert will display the name of the source code file and the line number on which the assert code was placed. Although the name of the source code file will be the same from one build to the next, the line number on which the assert code was placed will change from build to build. It is often difficult to determine whether an assert occurring with two different internal builds of the program is in fact a single assert that has moved to a different line after each subsequent build.

The result is that a software developer or tester may make many duplicate entries for the same assert into the internal database containing bug information. Testers also run the risk of someone believing an assert is a duplicate when it is not, in which case the bug never gets logged in or entered, and the bug never gets fixed. Testers of software applications in particular have a much more difficult time determining or knowing whether an assert is a duplicate based on information traditionally provided because testers do not work with the actual code. All of the duplicated information for the asserts in the bug system leads to inefficiency. For example, testers may spend an inordinate amount of time attempting to locate bugs that turn out to be duplicates of previously fixed bugs, and development can spend a great deal of time tracking down what are really duplicate entries for the same assert.

Therefore, there is a need for a system and method that eliminates the entry of duplicate information for the same asserts into a database containing information about bugs associated with a particular software application or program. Such a method or system would improve the internal efficiency of a product development process. Such a system would also allow for improved stability over the lifecycle of a product to help with the development process.

SUMMARY OF THE INVENTION

The present invention satisfies the need described above by providing a method and system for tracking asserts throughout the developmental lifecycle of a software application.

More specifically, the present invention is a system and method for associating an assert with a unique identifier ("assert tag"), and using the unique identifier to store information associated with the assert in a database. When the assert is hit, the assert calls upon an executable program module that reports the assert tag and other event information to a server. Using the assert tag, information associated with the assert can be stored in a database or repository that contains assert information.

The information stored in the database can be, for example, the unique identifier associated with the assert, the number of times the assert has been hit in a released version of a software program, the maximum version released of the software program in which the assert has been hit, the number of times the assert has been hit in the maximum version released of the software program, the maximum number of times the assert has been hit in an unreleased version of the software program, and an identifier associated with a bug or a number of bugs that are associated with the assert. This information can be updated upon every reporting event, and the assert information can be displayed to the developer or tester.

Additionally, information for the bugs associated with the assert can also be retrieved from a database containing bug information and displayed to the developer or tester. For example, this information may be displayed in a dialog box (assert dialog box) that is displayed to the developer or tester in response to an assert being hit.

Once the developer or tester has been presented with the information concerning the bugs associated with the assert, or other information associated with the assert, the developer or tester can choose to enter, or log, a new bug into the database containing bug information.

These and other features, advantages, and aspects of the present invention may be more clearly understood and appreciated from a review of the following detailed description of the disclosed embodiments and by reference to the appended drawings and claims.

DETAILED DESCRIPTION

The present invention provides a system and method for tracking and entering asserts in a software development environment. The system and method is an automated process by which each assert can be assigned a unique "tag" and that assert tag can be used to track assert hits and also eliminate duplicated entries into a database containing information relating to the bug that caused the assert to fire.

More specifically, after each build of a program is completed, but before testing begins, an "assert tag" program is run over the program's source code ensuring that each assert that is contained in the program is given a unique tag, and that a given assert's tag is preserved across different builds and different versions.

Generally, this program is a search-and-replace algorithm that replaces the assert codes entered by the developers with an assert code that will display a unique identifier in the assert dialog when the assert is hit. Such a unique identifier, or "assert tag" can be, for example, a combination of alphanumeric characters such as "gggo" or "eupo" or "erbm." This information can then be stored in an "assert tag" database.

The search-and-replace program may rely on an internal database that keeps track of each tag that has been used. Each time a new assert is encountered that has not been tagged, the search-and-replace program will replace the assert with a new assert that will display a newly assigned tag or identifier. The result is that each time an assert is hit, that assert will always display the assert tag that has been associated with it.

Further, tagging asserts allows for the automatic gathering and presentation of information about an assert and any bugs associated with it. This information can be contained in a database or data repository and presented by assert dialogs that are displayed when an assert has been hit.

A developer, when presented with this information, can act to ensure that no duplicate bugs are entered into the bug information database for the same assert.

In one embodiment, the invention used in the "OFFICE" program module, marketed by Microsoft Corporation of Redmond, Wash. Briefly described, the "OFFICE" program module is a suite of word processing, spreadsheet, presentation, database, and time management application programs along with program modules that integrate and enhance these application programs. While the invention will be described in the general context of the "OFFICE" program module running in conjunction with a personal computer, those skilled in the art will recognize that the invention also may be implemented in combination with other program modules.

Having briefly described an embodiment of the present invention, an exemplary operating environment for the present invention is described below.

Referring now to the drawings, in which like numerals represent like elements throughout the several figures, aspects of the present invention and the exemplary operating environment will be described.

Figure 1:
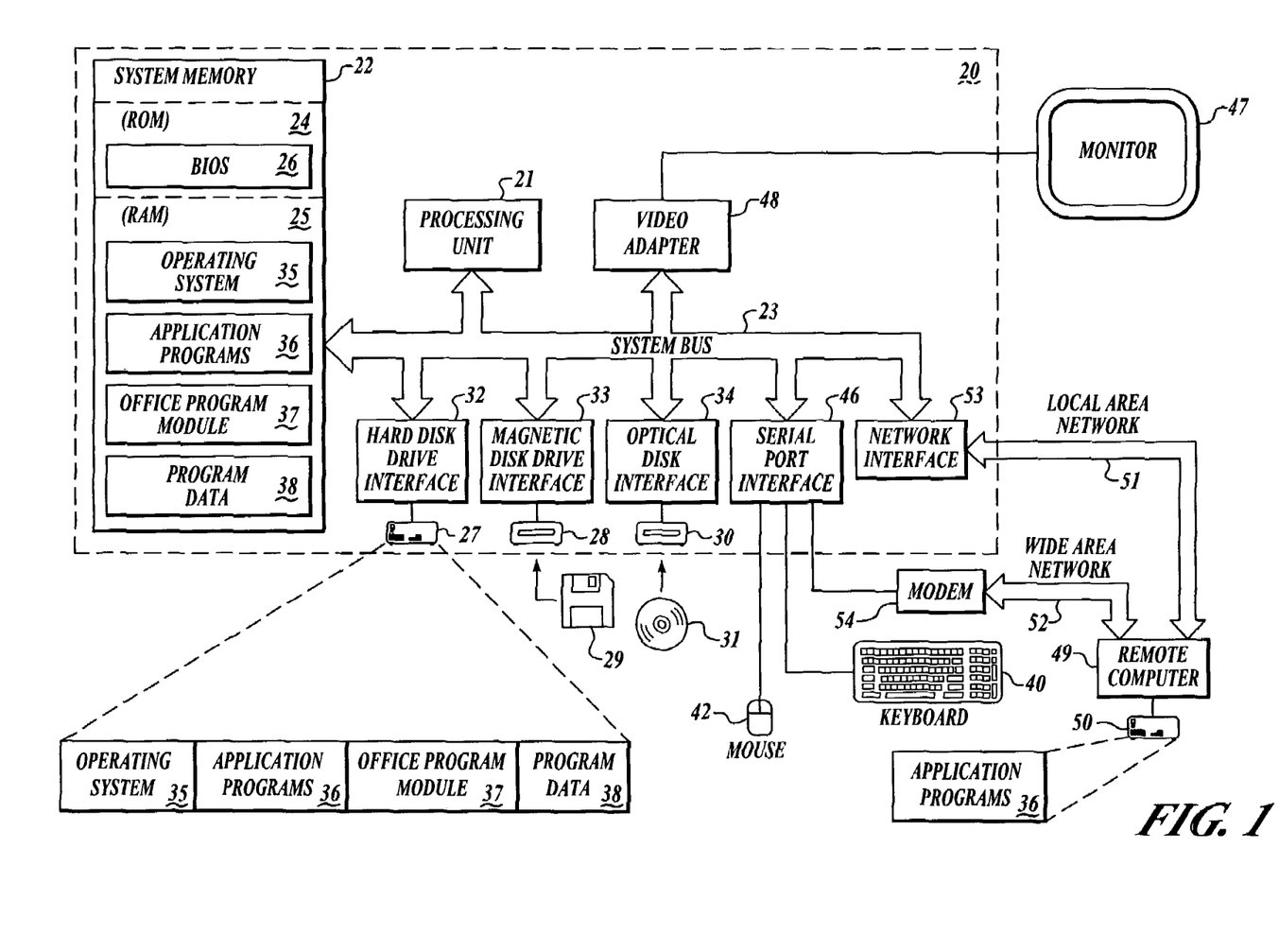
FIG. 1 is a block diagram of a computer that provides the exemplary operating environment for the present invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, an "OFFICE" program module 37, program data 38, and other program modules (not shown).

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet.

The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
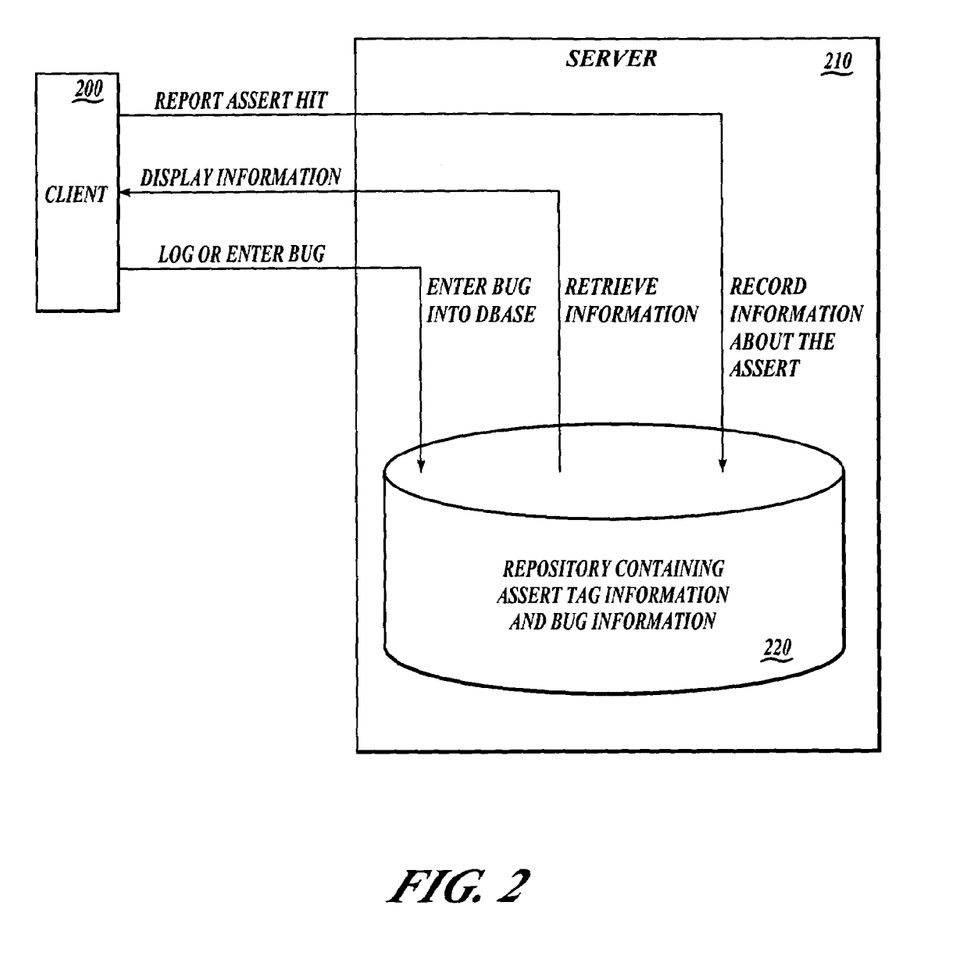
FIG. 2 is a component block diagram of an exemplary system for reporting an assert, recording and updating a database associated with the assert based on its assert tag, and retrieving and displaying information concerning the assert and bugs associated with the assert.

FIG. 2 depicts how specific system components of the present invention interact with one another. In particular, the software application runs on the software developer or tester's computer, or the client 200.

In the preferred embodiment of the present invention, once an assert has been hit, an executable program module initiates communication between the client or developer's application and a server 210 containing assert tag and bug information, which is stored in a database or a data repository 220. The executable program. initiates communications that report the assert as being hit. The server 210 receives this information and updates the database entry associated with the assert, thus recording information about the assert in the server's repository 220.

In the preferred embodiment of the present invention, the server can use the assert tag to- retrieve information about all the bugs associated with the assert that has been hit. This information is provided to the client 200 to be displayed to the developer or tester. Preferably, this information can be displayed in the assert dialog box that was launched when the assert was hit.

Still referring to FIG. 2, the developer or tester, upon reviewing the assert tag and bug information, may see whether the bug that caused the present assert to fire has been entered into a bug information database. If the developer determines that the bug has not been entered, the developer or tester may choose to log in or enter the bug into a bug information database that comprises, for example, the server repository 220.

Those of ordinary skill in the art of information and database management will appreciate that assert tag information and bug information may be stored in separate databases, separate repositories, repositories located on either the client or server side, or numerous other repositories.

Figure 3:
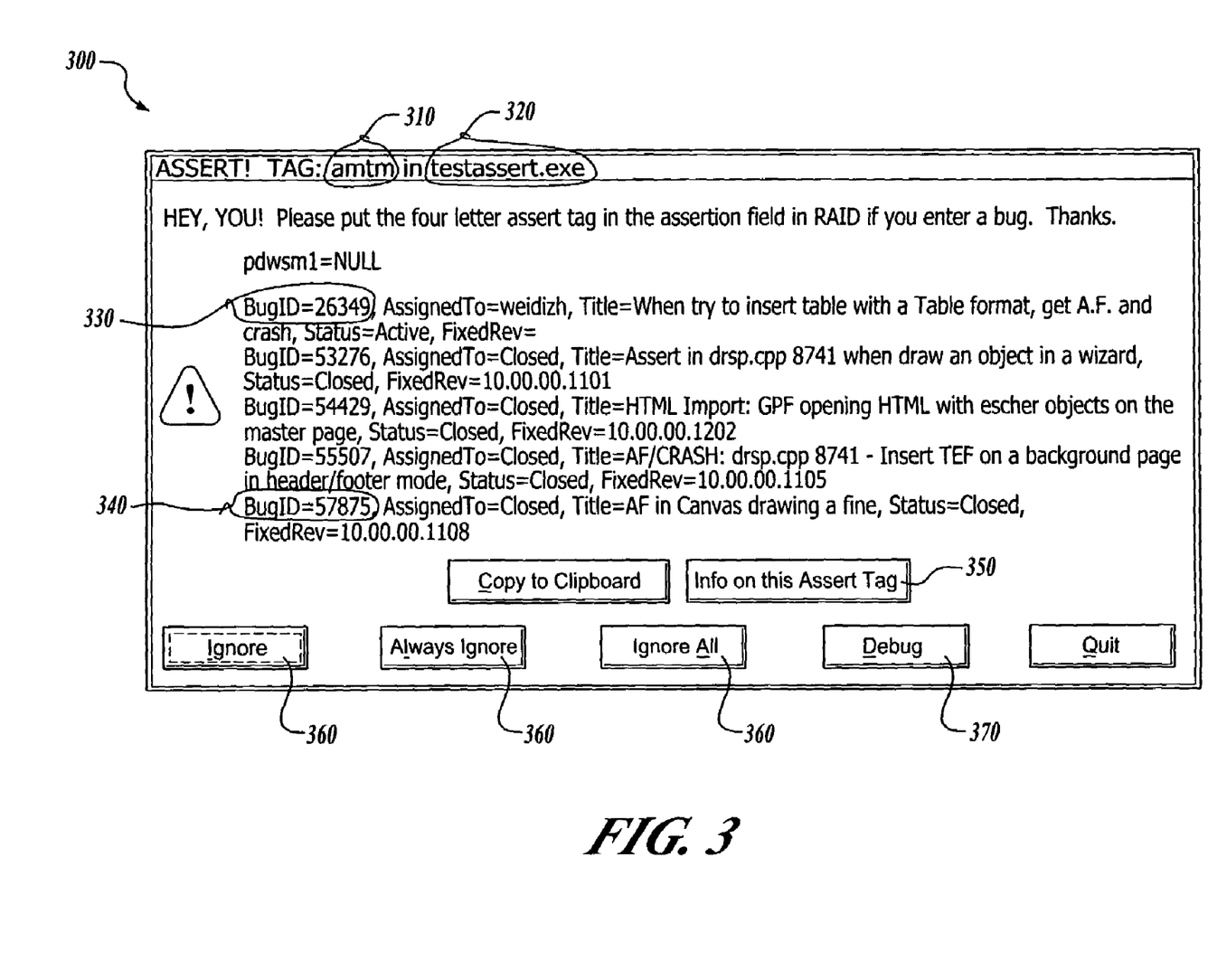
FIG. 3 is a screen shot of an assert dialog box that displays information including the assert tag, bugs related to the assert tag, and the status of the bugs.

FIG. 3 represents an assert dialog box 300 of the present invention. The assert dialog box depicted in FIG. 3 displays information such as the assert tag 310, which in this example is indicated by the identifier "amtm," and information such as the name of the software application 320 being tested, which in this example is "testassert.exe."

Once the assert has been reported via the executable program module described in the text accompanying FIG. 2 above, all bug information associated with that particular assert may be retrieved from the assert tag and bug information databases and presented in the assert dialog box 300. Those of ordinary skill in the art will appreciate how to match assert information to bug information based on the unique identifiers associated with the assert (i.e., the assert tag) and the unique identifiers associated with each bug. Still referring to FIG. 3, a developer or tester encountering assert dialog 300 can see that bug 330, identified as "BugID=26349" is associated with assert tag amtm 310.

The developer can also see the information about bug 330. In this example, the developer is able to see that the bug causing the assert occurs when one tries to insert a table with a Table format because the "Title" field informs the developer of this. A developer or tester can also be informed that the status of the bug 330 is still "active," i.e., hasn't been fixed. Conversely, with bug 340, identified as BugID=57875, the developer or tester can see that the bug has been fixed since the status of the bug is "closed." This person encountering the assert dialog can then enter a bug into the bug system if no bug is listed by the assert dialog, or he or she can reactivate a closed bug, or the person can ignore the bug.

By clicking on "Info on this assert tag" link 350, a developer or tester can cause the system to display information about the particular assert based on it's assert tag. The assert tag information that can be obtained is described in more detail below in FIG. 6 and its accompanying text. Additionally, a developer with information about the bugs associated with an assert may merely ignore the assert dialog by clicking on ignore buttons 360. In keeping with the spirit of this invention, any information that may be helpful to a software tester or developer may be stored, retrieved, and displayed.

Figure 4:
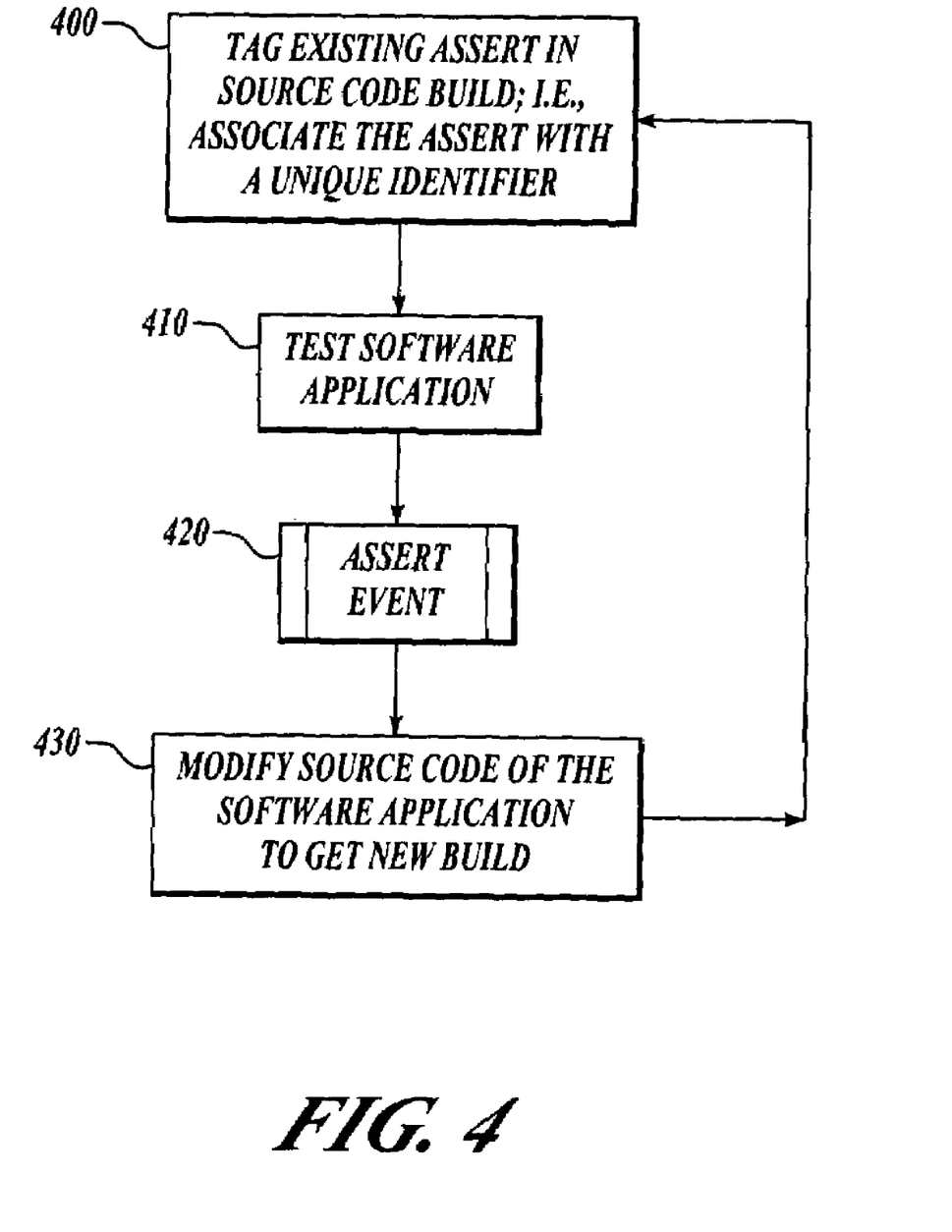
FIG. 4 is a flowchart illustrating an exemplary method for tagging an assert, testing an application, resolving an assert event, and modifying the source code of the application based on the resolution of the assert event.

FIG. 4 describes the method of tagging asserts. In step 400, asserts in a software application's source code are tagged using a search-and-replace program. This program is run over the program's source code and replaces each assert with an assert that will fire and display in the assert dialog a unique "assert tag" to the developer or tester. This process was described in conjunction with FIG. 2 of this application.

Still referring to FIG. 4, once the asserts in the program have been tagged, a software developer or tester tests the application at step 410. Each time an assert dialog box 300 is encountered due to a faulty or failed condition arising during the program's execution, there is an "assert event" 420. The assert event is described below in FIG. 5 and the text accompanying FIG. 5.

Once the assert event is complete, at step 430 software developers, in an attempt to fix the cause of the failed condition resulting in the firing of the assert, can modify the source code of the software application, thus creating the next build for the software application. During this process, more asserts may have been added to the source code.

After the creation of the subsequent build, the process is repeated so that any new asserts that were created may be replaced with asserts that are tagged.

Figure 5:
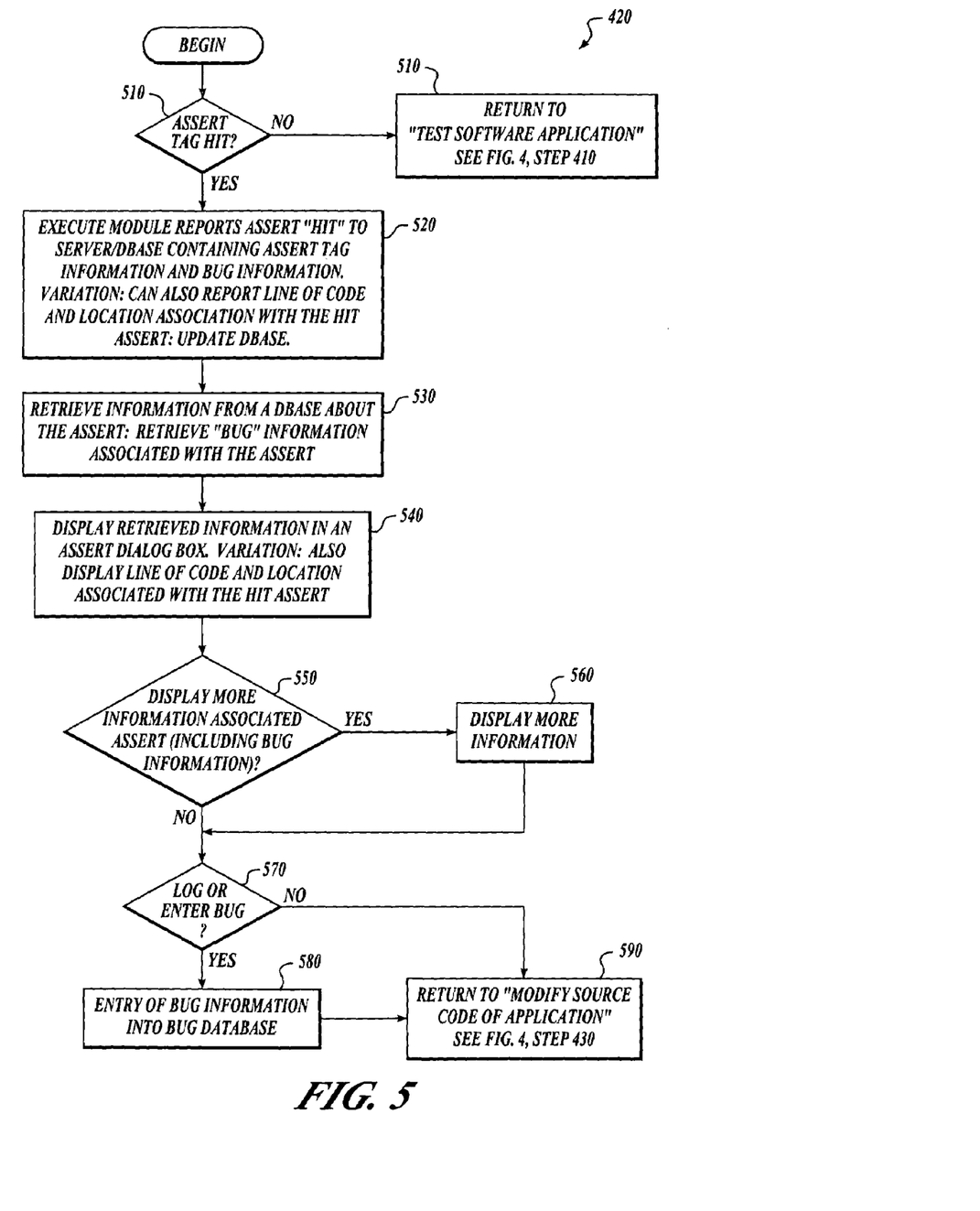
FIG. 5 is a flowchart depicting an exemplary method for reporting and recording an assert event, an retrieving and displaying information associated with the assert.

FIG. 5 depicts an exemplary method for processing an assert event. At step 500, an assert may be hit, or it may not be hit. If an assert has not been hit, the tester can choose to test the software again at step 510, described in step 410 of FIG. 4.

Still referring to FIG. 5, if an execution causes an unstable state, the assert will fire. At step 520, the assert will execute an executable module that reports the hit to the server 210 that contains the repository 220 that houses the assert tag information and bug information. In another embodiment of this aspect of the present invention, the assert may also cause the executable program module to report the location of the assert tag in the source code, as well as the code comprising the assert. When the information is reported to the server 210, the server updates the information stored in the database, or repository 220.

At step 520, the executable program module causes the server 210 to retrieve assert and bug information from the repository 220.

Figure 6A:
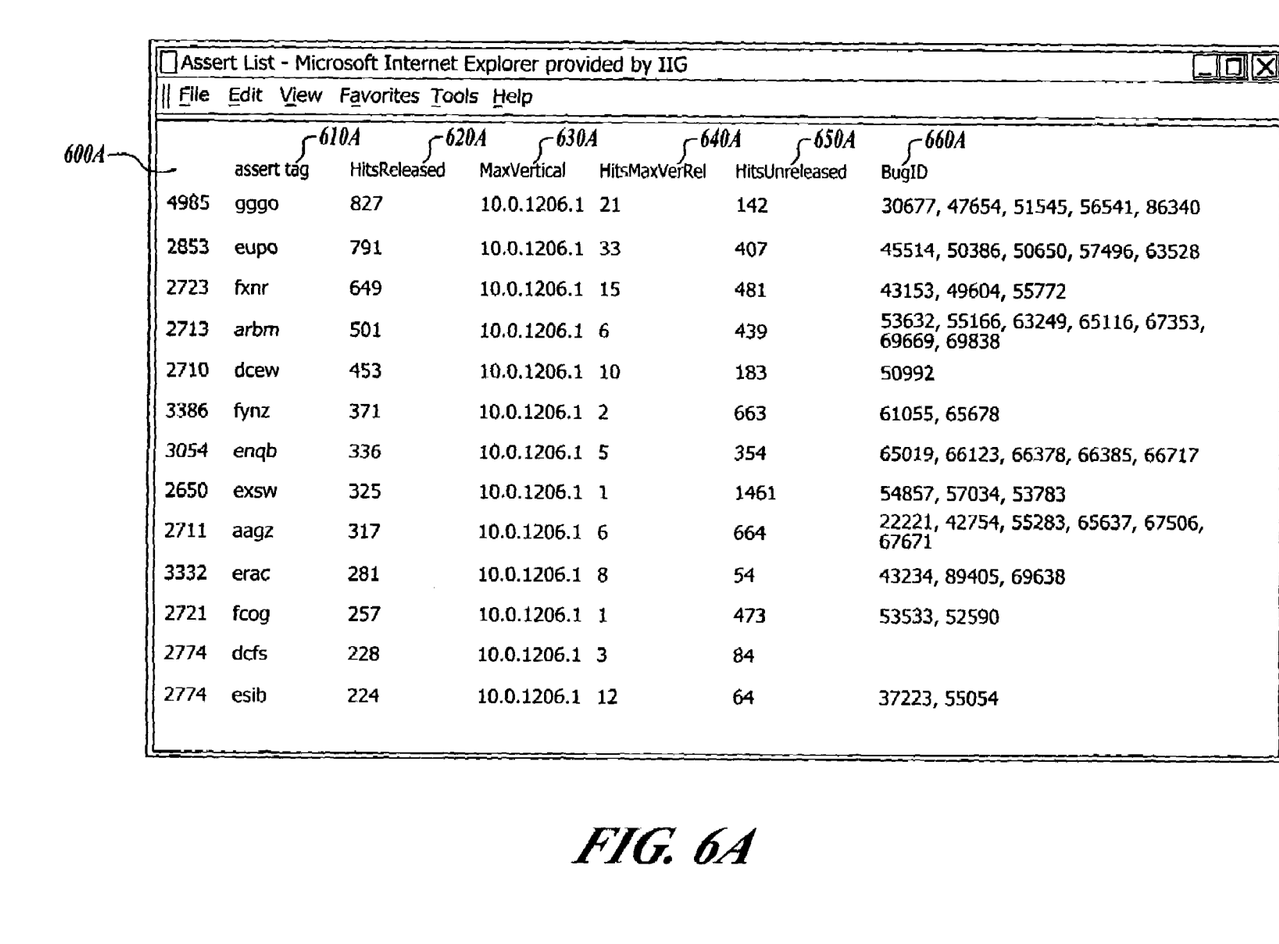
FIG. 6A and FIG. 6B are illustrations of the type of assert and bug information that can be reported, retrieved, and displayed using assert tags.
Figure 6B:
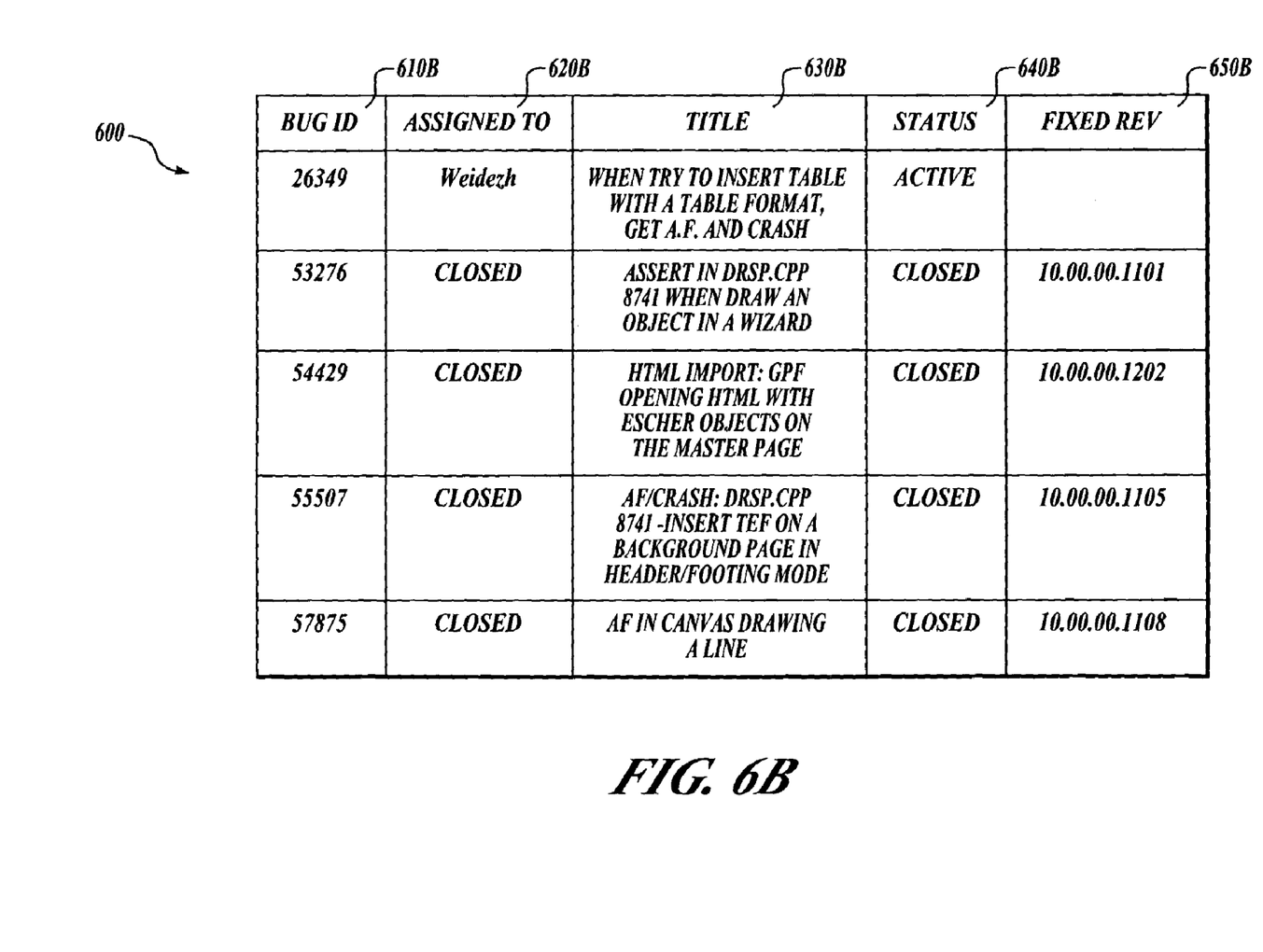

At step 540, the information that is retrieved can be displayed by the system on the client's side to the software developer via an assert dialog. An example of such a dialog was described previously in FIG. 3. The information displayed may include any information that is stored in the repository 220 of the assert tag server 210. An example of such information is illustrated by FIG. 6A and FIG. 6B and described by the text accompanying FIG. 6A and FIG. 6B.

Again referring to FIG. 5, at step 550, the system determines whether the developer or tester wants to see more information. The system may give the developer the option of seeing more information about the assert by presenting in the assert dialog 300 an "Info on this assert tag" 350. When the user selects this command, the system will display more information concerning the assert. Such information is described generally in FIG. 6A and its accompanying text. An alternative embodiment of this aspect of the invention is that all information is displayed to the developer or tester.

At step 570 of FIG. 5, a software developer or tester, after being notified with the assert dialog box, may determine whether to enter information about the bug into a database or repository. At 580, the software developer may enter this information into a bug database manually using a separate bug tracking application.

Step 570 and step 580 may be accomplished in a variety of alternative ways, using a variety of data entry means. For example, those of ordinary skill in the art will appreciate that an assert dialog box 300 may contain a user command button that initiates the entry of information into a bug or assert repository. Thus, at 570, the system may evaluate the user command to determine whether the user wishes to enter in the bug and assert information. If the user has indicated a desire to enter in such information, the system will initiate a program or operation that would allow entry of the information. Those of ordinary skill will appreciate that that the entry of this information may be accomplished in a variety of ways, using a variety of data entry means.

Once the assert has been dealt with, the developer at 590 may choose to modify the source code to eliminate the bugs found, which is step 430 of FIG. 4. To facilitate the debugging, the preferred embodiment of the present invention enables a software developer to break into the debugger at the point of the assert. An example of a debug button is shown in FIG. 3 element 370.

FIG. 6A is an example of an assert tag table 600a that contains various types of information associated with asserts. This information may be stored, for example, in the repository 220 of an assert tag server 210. The assert tag column 610A displays the unique tags associated with each assert. These tags can be, for example, alphanumeric characters.

The HitsReleased column 620A contains information about the number of times the assert has been hit in released versions of the application. The released version is defined as the version that has been created by the entire development team that is ready for testing.

The MaxVerRel column 630A contains data representing the "maximum version released" of the software build that the assert has been hit in, and the HitsMaxVerRel column 640A indicates the number of times the assert was hit in that version. Thus, from the table, a developer or tester can see that throughout the lifecycle of the software application's life, the assert in question, 4985 for example, has been hit 827 times, but that it has been hit 142 times in version 10.0.1206.1, which is maximum version number in which the assert appears.

Developers may also have their own "unreleased" builds that they individually work on. The HitsUnreleased column 650A provides an indication of how many times the assert in question has been hit in all unreleased developers build versions.

Additional information may include the unique bug identification number of every bug that is associated with a particular assert. The BugID column 660A contains information about each bug that is associated with a particular assert The information in FIG. 6A can be accessed by a developer or tester that clicks on the "Info on this assert tag" button 350.

Furthermore, a separate database may be maintained that contains information about each particular bug that has been entered into a database. In the preferred embodiment of the present invention, the information in FIG. 6B is displayed in an assert dialog, for example, assert dialog box 300 of FIG. 3.

Referring to FIG. 6B, BugID column 610B shows the unique number associated with a particular bug. Like assert tags, bug identification numbers or bug tags can be used to categorize bugs and improve the efficiency of the software development process.

The "Assigned To" column 620B in FIG. 6B contains information about which software developer is currently assigned to eliminate the bug. This information can be used to ensure that no two developers are working to resolve the bug. The information can also be used to facilitate coordination and cooperation among those developers who wish to eradicate the same bug.

Title column 630B of FIG. 6B describes the actual operation or sequence of operations that led to the crash (or assert being hit). The Status column 640B indicates whether a bug has been fixed. If a bug has not been fixed, then the status of that bug is still "open." The "fixed rev" column 650B shows the version number of the software application that the bug was fixed in.

By having access to the information shown in FIG. 6A and FIG. 6B, developers and testers will be able to improve the efficiency of finding and eliminating bugs in computer programs. Those of skill in the art will appreciate that the data and information contained in the tables and databases of the present invention are not limited. Any information that can be useful to a developer or tester in a software development environment can be updated, stored, retrieved, or displayed.

Thus, the present invention solves the problems indicated in the background of this application. Currently, asserts alert a tester or developer of a bug or illegal operation that has been executed, but merely provide the name of the source code and the location of the assert code within the text of the source code. However, as multiple builds of the same software application are created, the same assert may give a different line number with each new release of a subsequent build.

The present invention solves this problem by tagging these asserts so that each time a particular assert is hit, it will display one unique identifier. This will prevent different testers from making duplicate bug entries associated with the same assert.

Further, the invention of the present application provides for the reporting, storage, and display of relevant information concerning all asserts, as well as any and all bugs associated with the assert. Information such as the date the bug associated with the tag was encountered, which bugs are associated with the tag, the version number of the software program, and the number of times a particular bug has been encountered with an assert, and other sources of information can be gathered, stored, and used to improve the software product development process. Collecting and having access to this information provides testers and developers with more information so that they can eliminate bugs more efficiently.

We claim:

1. A computer-implemented method for tagging asserts in a software program, comprising:
    associating an assert in the software program with a unique identifier;
    determining when the assert is hit during software program execution; and
    storing assert information in a database based on the unique identifier, wherein the assert information comprises:
        the unique identifier; and
        the number of times the assert is hit during software program execution.

2. The computer-implemented method of claim 1, wherein the assert information further comprises the number of times the assert is hit in a released version of the software program.

3. The computer-implemented method of claim 1, wherein the assert information further comprises the number of times the assert is hit in an unreleased version of the software program.

4. The computer-implemented method of claim 1, wherein the assert information further comprises:
    the maximum version released of the software program; and
    the number of times the assert is hit in the maximum version released of the software program.

5. The computer-implemented method of claim 1, wherein the assert information further comprises a bug identifier that identifies bug information associated with the assert.

6. The computer-implemented method of claim 5, further comprising:
    retrieving the bug information from the database; and
    displaying the bug information.

7. The computer-implemented method of claim 1, further comprising reporting that the assert is hit in response to the assert being hit.

8. A system for tracking asserts in a program module, comprising:
    a storage device coupled to the processing unit, wherein the program module is stored in the storage device; and
    a processing unit coupled to the storage device, wherein the processing unit, in response to instructions from the program module, is arranged to:
        associate an assert in the program module with a unique identifier;
        determine when the assert is hit during execution of the program module; and
        store assert information in the storage device based on the unique identifier,
    wherein the assert information comprises:
        the unique identifier; and
        the number of times the assert is hit during execution of the program module.

9. The system of claim 8, wherein the assert information further comprises the number of times the assert is hit in a released version of the software program.

10. The system of claim 8, wherein the assert information further comprises the number of times the assert is hit in an unreleased version of the software program.

11. The system of claim 8, wherein the assert information further comprises:
    the maximum version released of the software program; and
    the number of times the assert is hit in the maximum version released of the software program.

12. The system of claim 8, wherein the assert information further comprises a bug identifier that identifies bug information associated with the assert.

13. The system of claim 12, wherein the processing unit is further arranged to:
    retrieve the bug information from the storage device; and
    display the bug information on the display device.

14. The system of claim 8, wherein the processing unit is further arranged to report that the assert is hit in response to the assert being hit.

15. A computer-readable medium having computer-executable instructions for tracking asserts in a software program, comprising:
   associating an assert in the software program with a unique identifier;
   determining when the assert is hit during software program execution;
   reporting that the assert is hit in response to the assert being hit; and
   storing assert information in a database based on the unique identifier, wherein the assert information comprises:
      the unique identifier; and
      the number of times the assert is hit during software program execution.

16. The computer-readable storage medium of claim 15, wherein the assert information further comprises the number of times the assert is hit in a released version of the software program.

17. The computer-readable storage medium of claim 15, wherein the assert information further comprises the number of times the assert is hit in an unreleased version of the software program.

18. The computer-readable storage medium of claim 15, wherein the assert information further comprises:
   the maximum version released of the software program; and
   the number of times the assert is hit in the maximum version released of the software program.

19. The computer-readable storage medium of claim 15, wherein the assert information further comprises a bug identifier that identifies bug information associated with the assert.

20. The computer-readable storage method of claim 19, further comprising:
   retrieving the bug information from the database; and
   displaying the bug information.

* * * * *

UNITED STATES PATENT AND TRADEMARK OFFICE
CERTIFICATE OF CORRECTION

| | | |
|---|---|---|
| PATENT NO. | : 7,644,393 B2 | Page 1 of 1 |
| APPLICATION NO. | : 11/190348 | |
| DATED | : January 5, 2010 | |
| INVENTOR(S) | : Kirk A. Glerum et al. | |

It is certified that error appears in the above-identified patent and that said Letters Patent is hereby corrected as shown below:

In column 11, line 4, in Claim 15, after "readable" insert -- storage --.

In column 12, line 15, in Claim 20, delete "method" and insert -- medium --, therefor.

Signed and Sealed this

Fifteenth Day of March, 2011

David J. Kappos
*Director of the United States Patent and Trademark Office*